United States Patent [19]

Bonafous

[11] 4,006,761
[45] Feb. 8, 1977

[54] EQUIPMENT FOR BOTTOM LOADING OF LIQUID PRODUCTS

[75] Inventor: Maurice Bonafous, Gurmencon, France

[73] Assignee: Applications Mecaniques et Robinetterie Industrielles A.M.R.I., Paris, France

[22] Filed: Apr. 23, 1975

[21] Appl. No.: 570,797

[30] Foreign Application Priority Data

May 2, 1974 France .............................. 74.15261

[52] U.S. Cl. ................................. 141/94; 141/113; 141/128; 141/207; 141/346; 141/DIG. 1
[51] Int. Cl.² .......................................... B65B 3/30
[58] Field of Search ................. 141/113, 83, 94–96, 141/346–362, 207, 382–386, DIG. 2, 311 A, DIG. 1, 46; 222/71, 51, 154–159

[56] References Cited

UNITED STATES PATENTS 2,979,087  4/1961  Vogt .................................. 141/113

Primary Examiner—Houston S. Bell, Jr.
Attorney, Agent, or Firm—Haseltine, Lake & Waters

[57] ABSTRACT

Apparatus for supplying a liquid product to a pipe connected to the bottom of a vessel from a flexible conduit connected to a distribution system comprising a tank valve connected to the pipe and a coupling connected to the flexible conduit and adapted for connection to the tank valve. The tank valve includes a hollow body one part of which has a large aperture and a coupling mechanism for attachment with the coupling; a flap valve is disposed in the body for closing the aperture and the flap valve is connected via a linkage to an external operating lever; the coupling has a main casing with a connecting nose for lockable connection with the coupling mechanism of the body of the tank valve. A closure member is disposed in the casing for controlling flow of liquid product from the flexible conduit to the tank valve and a hydraulic ram acts on the closure member along with a cartridge having three springs of staggered force to provide the closure member with three stable positions of increasing opening.

17 Claims, 35 Drawing Figures

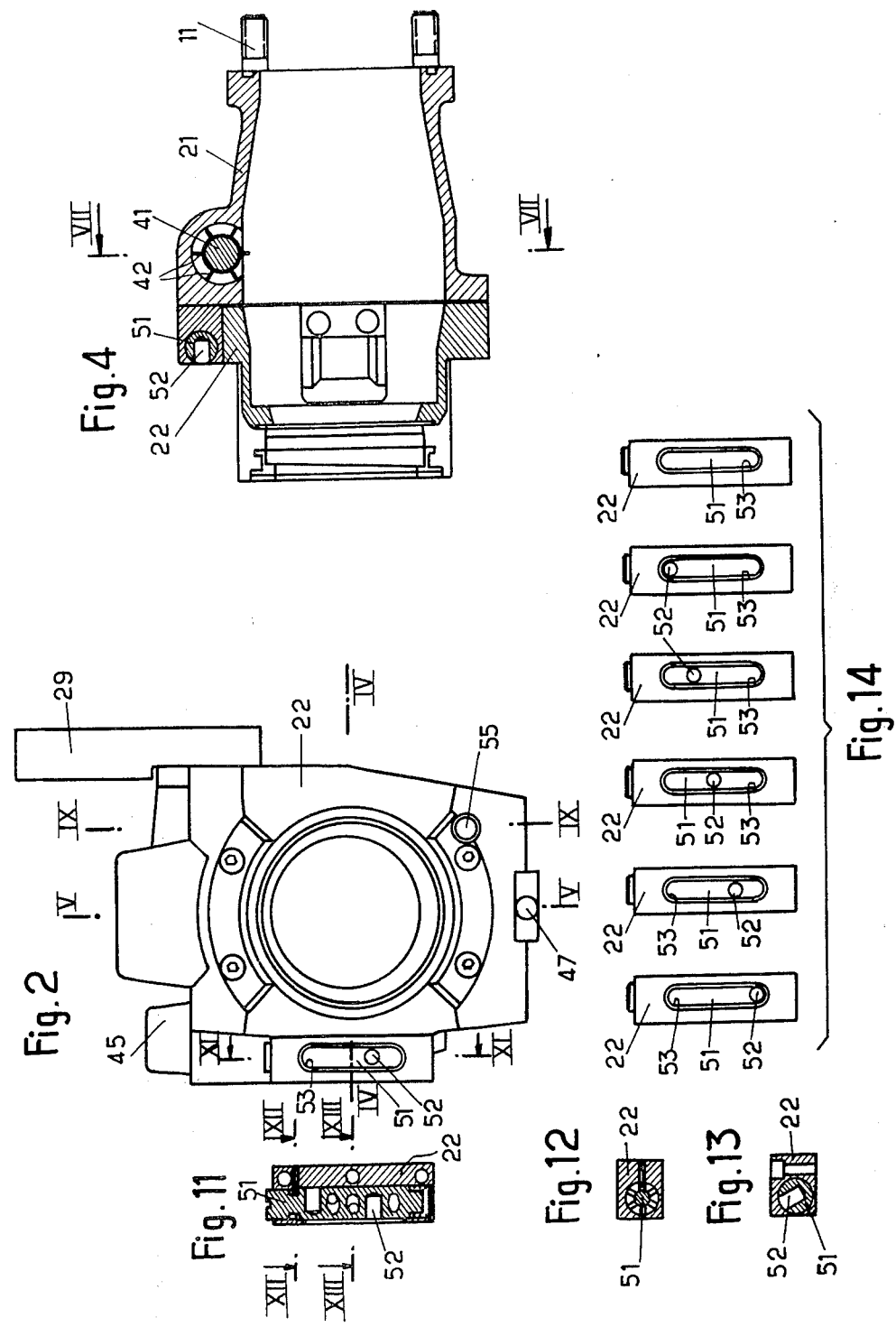

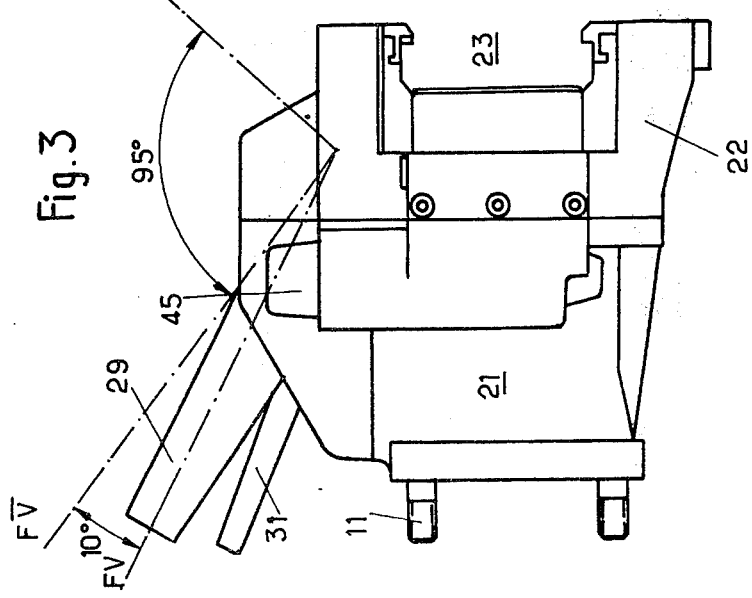
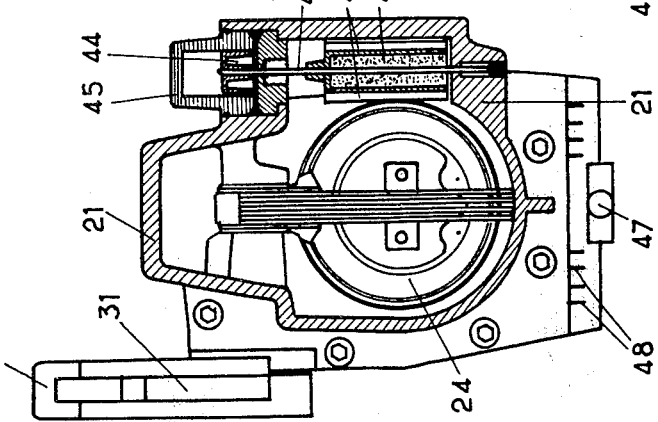
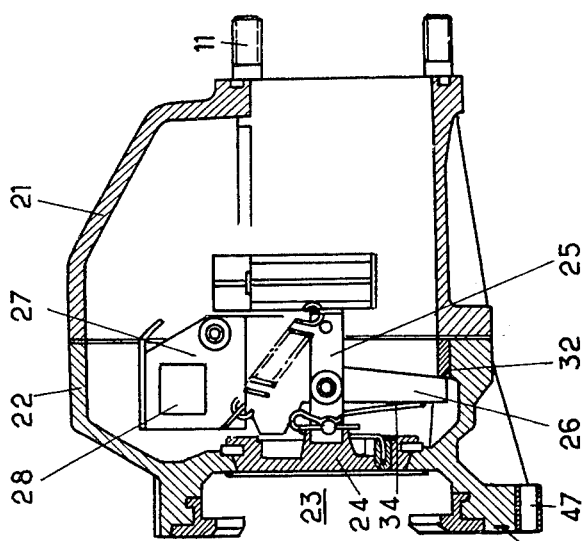

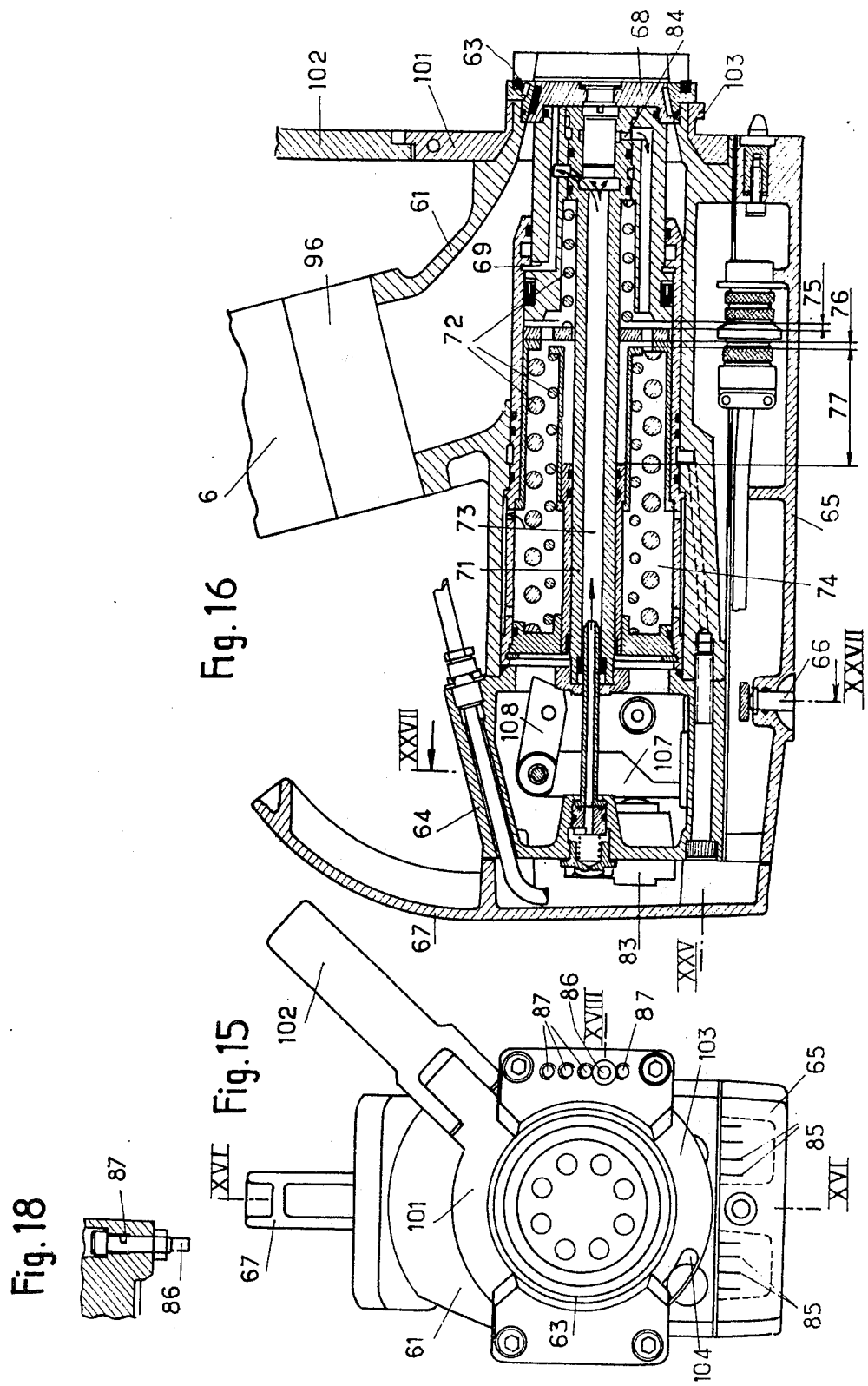

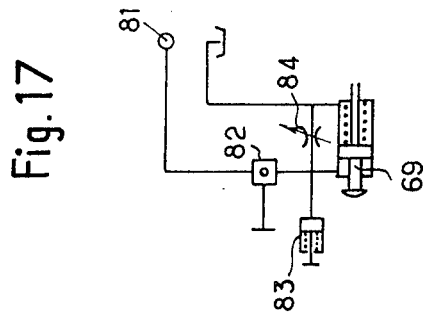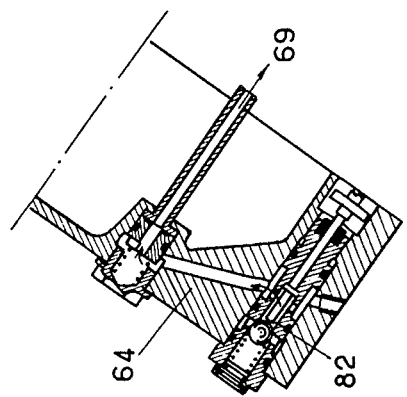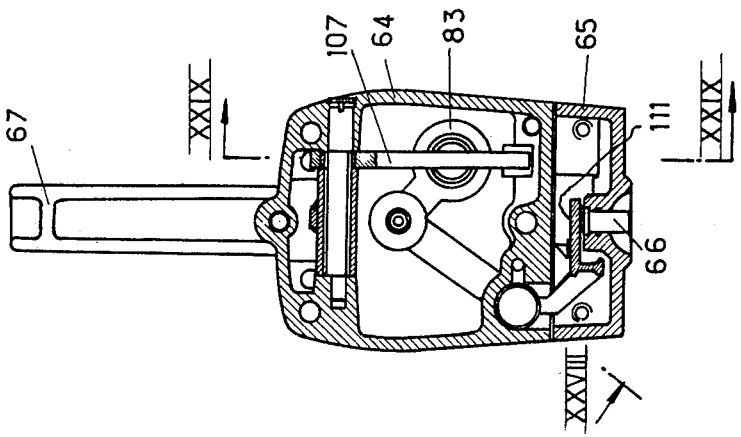

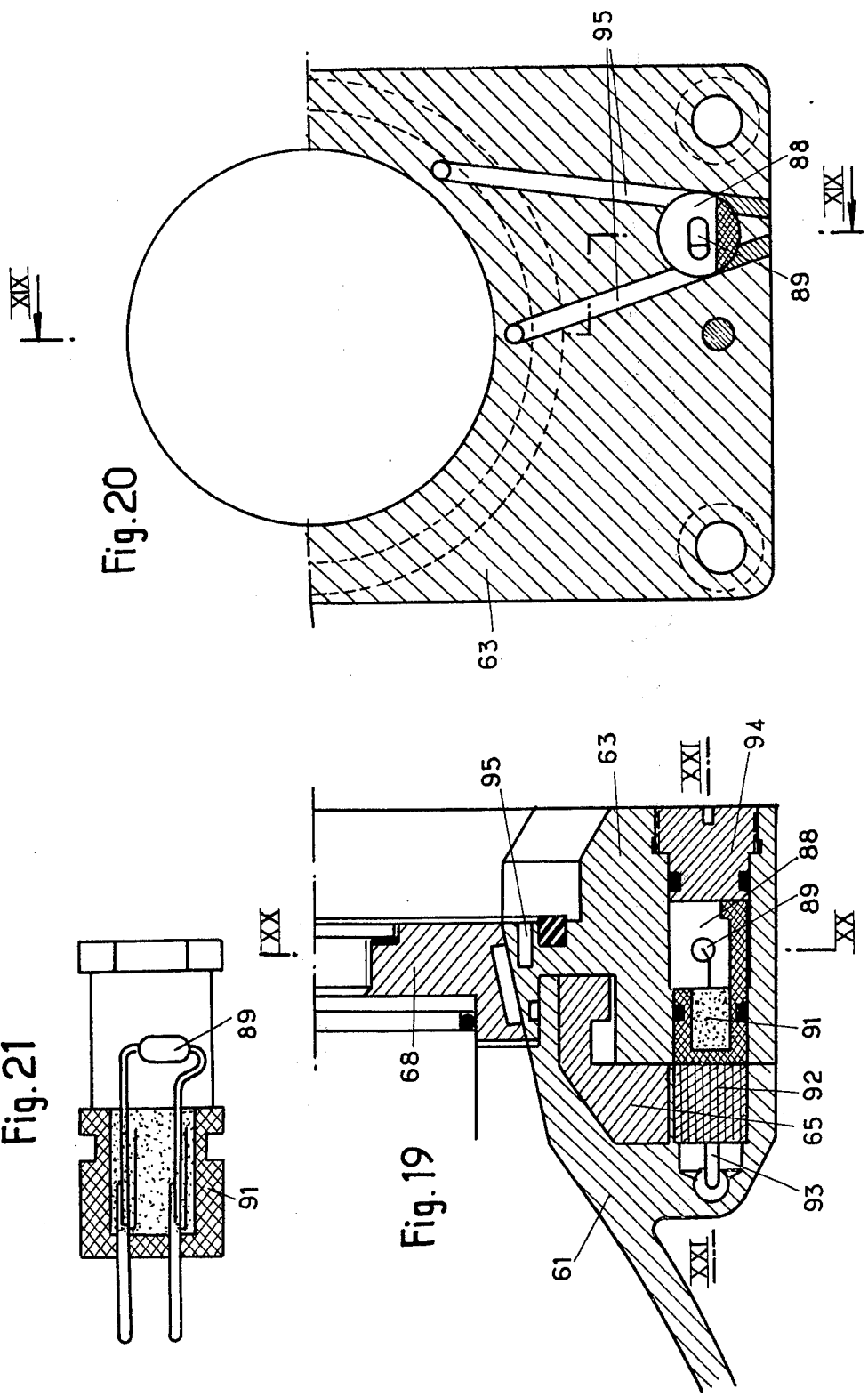

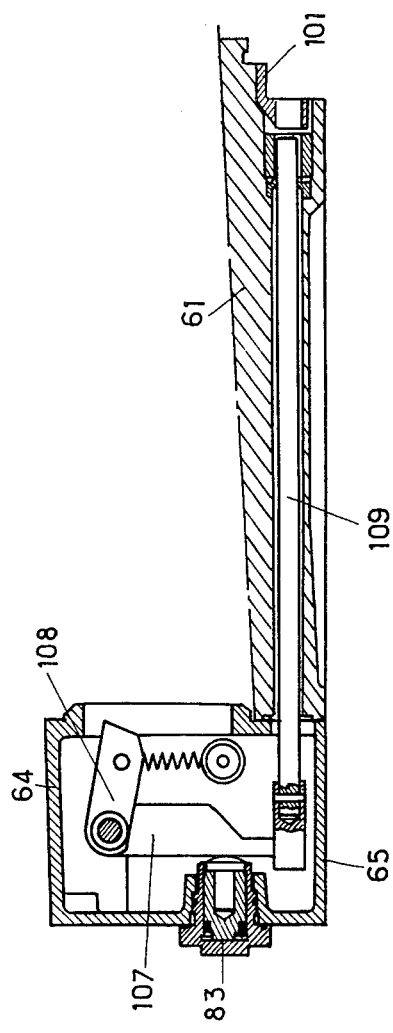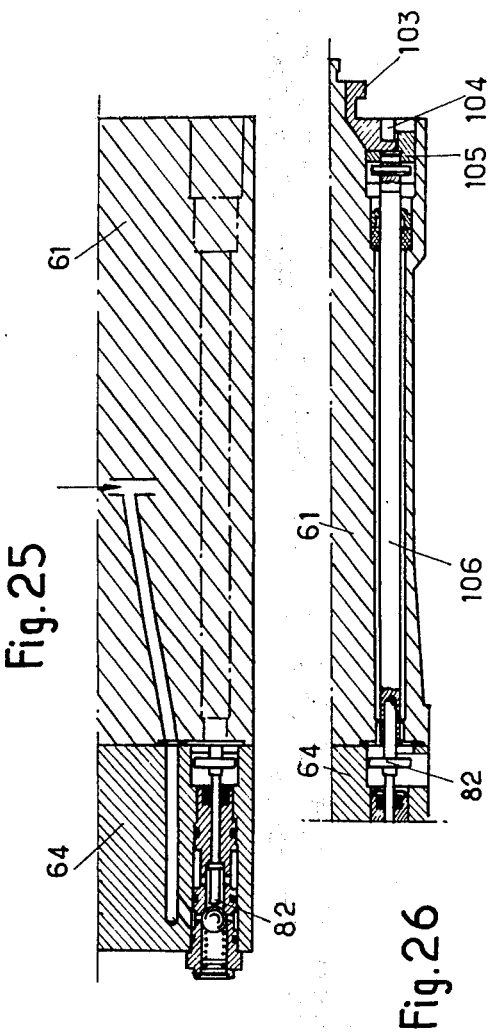

EQUIPMENT FOR BOTTOM LOADING OF LIQUID PRODUCTS

The invention relates to equipment for the bottom filling of liquid products and more particularly, but not exclusively, equipment for the bottom filling of tank wagons, tank cars or containers with liquid hydrocarbons.

Bottom filling consists of filling transport tankers from the bottom, through the same pipes which are used for discharge (emptying). Consequently, bottom filling eliminates any intervention on the top of the tankers and thus eliminates the resulting dangers for personnel (dangers of falling, inhaling hydrocarbon vapours and difficult escape in the case of a fire) as well as their serious drawbacks (overflowing, mixing of products, slowness due to filling the tanks of a lorry one after the other).

The bottom filling equipment according to the invention is of modular design, which makes it possible, with the basic equipment, to produce bottom filling equipment comprising some of the improvements mentioned hereafter, depending on questions of choice or advisability.

According to the invention, bottom filling equipment for liquid products combines a tank valve and a connector having three rates of flow (low rate for the beginning of filling, high rate and reduced rate for the end of filling) under hydraulic control, at the rate of one or more valves per tanker and one or more connectors per product line in the filling station, a tank valve being able to be provided with all or part of the improvements comprising visualisation of the rate of flow, coding of the tank capacity, a selector indicating the quality of the product to be loaded, a mechanism for locking in the closed position, a safety mechanism relating to the coupling during filling and a connector being able to be provided with all or part of the improvements comprising means for reading the capacity of the tank to be filled, a control of the emptiness of the tank prior to any filling, a device for reading the quality of product to be loaded in the tanker, various mechanical and hydraulic safety mechanisms, an automatic control, a manual control which may be substituted for the automatic control or replace it, a product counter with visual indication, a safety valve closed automatically by said safety mechanisms, a earthing control, an overflow control.

A preferred embodiment of the invention comprising all said improvements will now be described with reference to FIGS. 1 to 35, given as non-limiting examples, it being expressly stated that some of these improvements may be modified or eliminated as is clear to a man skilled in the art :

FIG. 2 is a front view of a tank valve according to said preferred embodiment of the invention;

FIG. 3 is a lateral elevational view of the valve according to FIG. 2;

FIG. 4 is a horizontal section on line IV—IV of FIG. 2;

FIG. 5 is a vertical section on line V—V of FIG. 2, the valve being in the closed and locked position;

Figure 6:
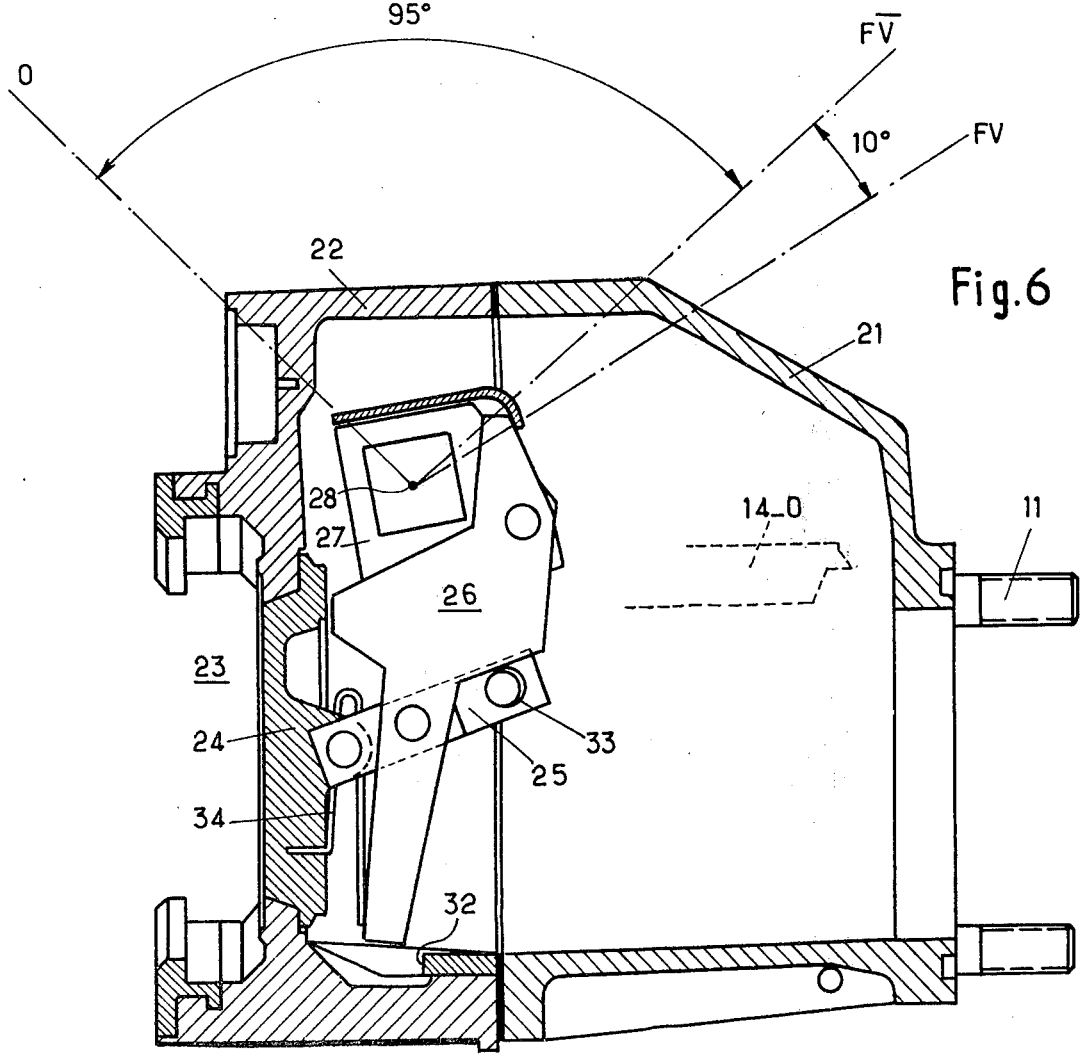
Figure 8:
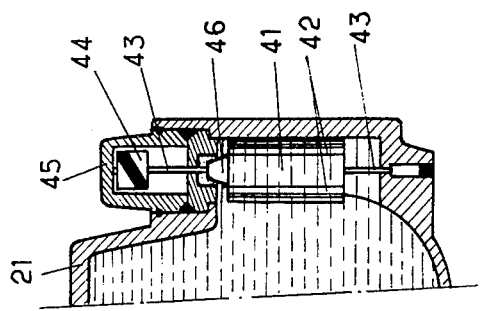
Figure 10:
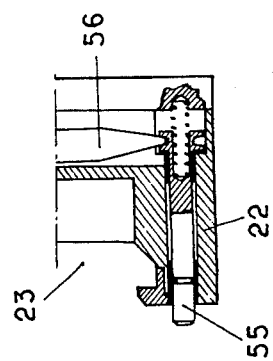
Figure 9:
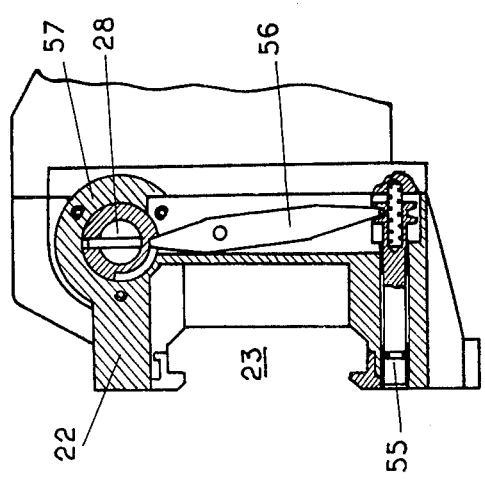
Figure 22:
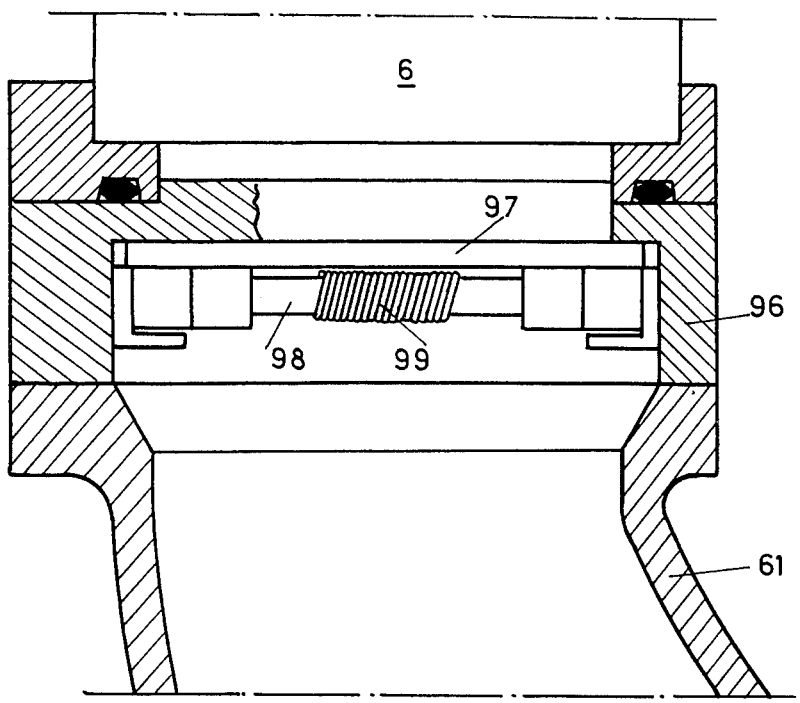
Figure 23:
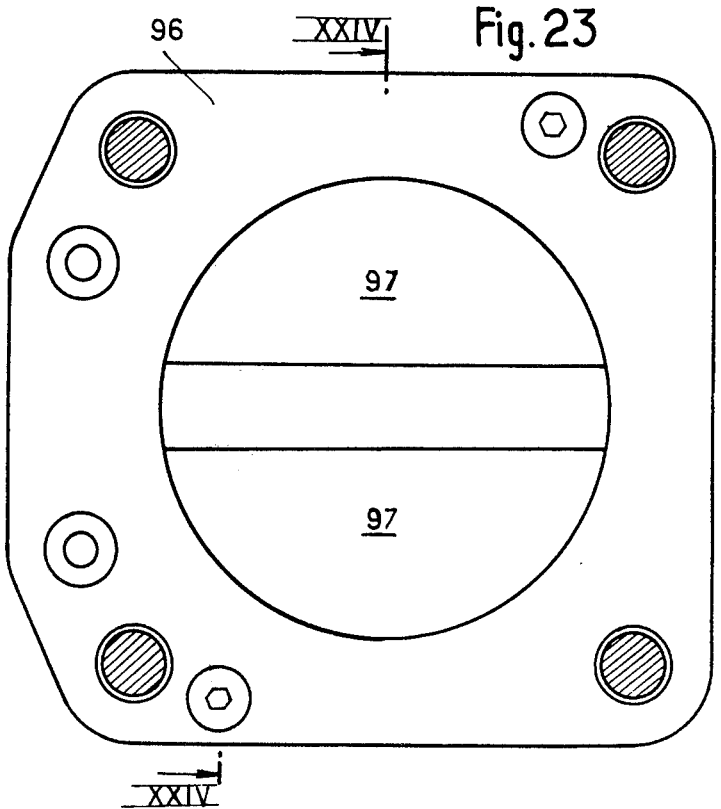
Figure 24:
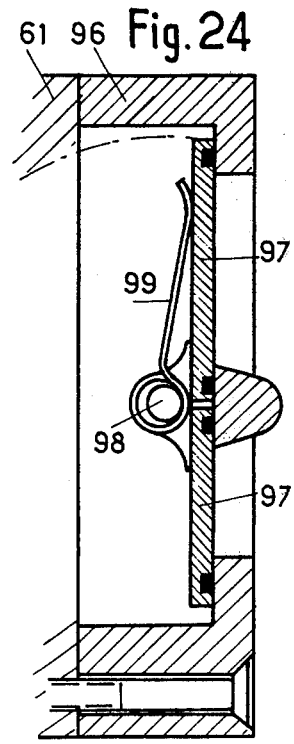
Figure 30:
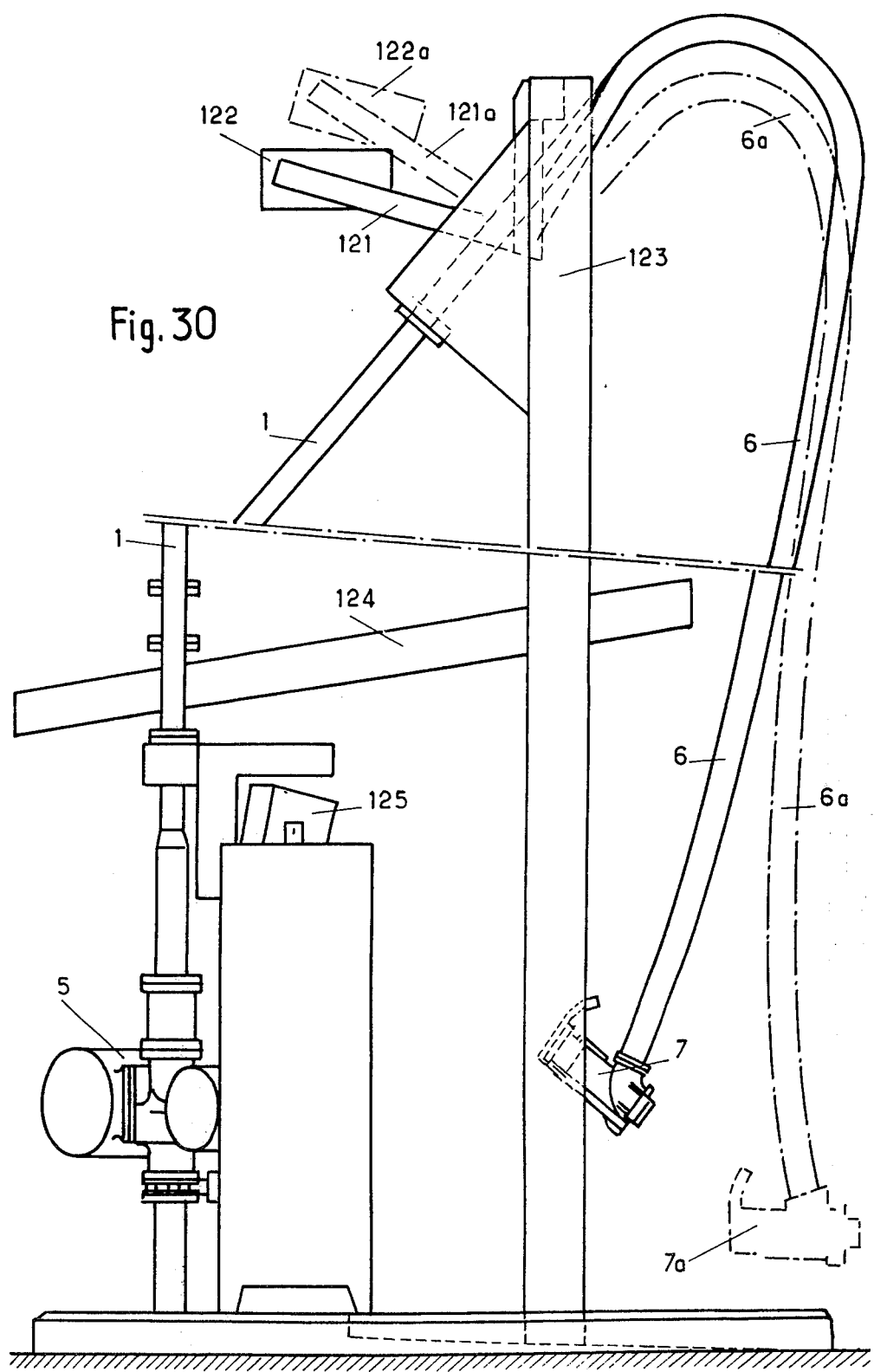
Figure 31:
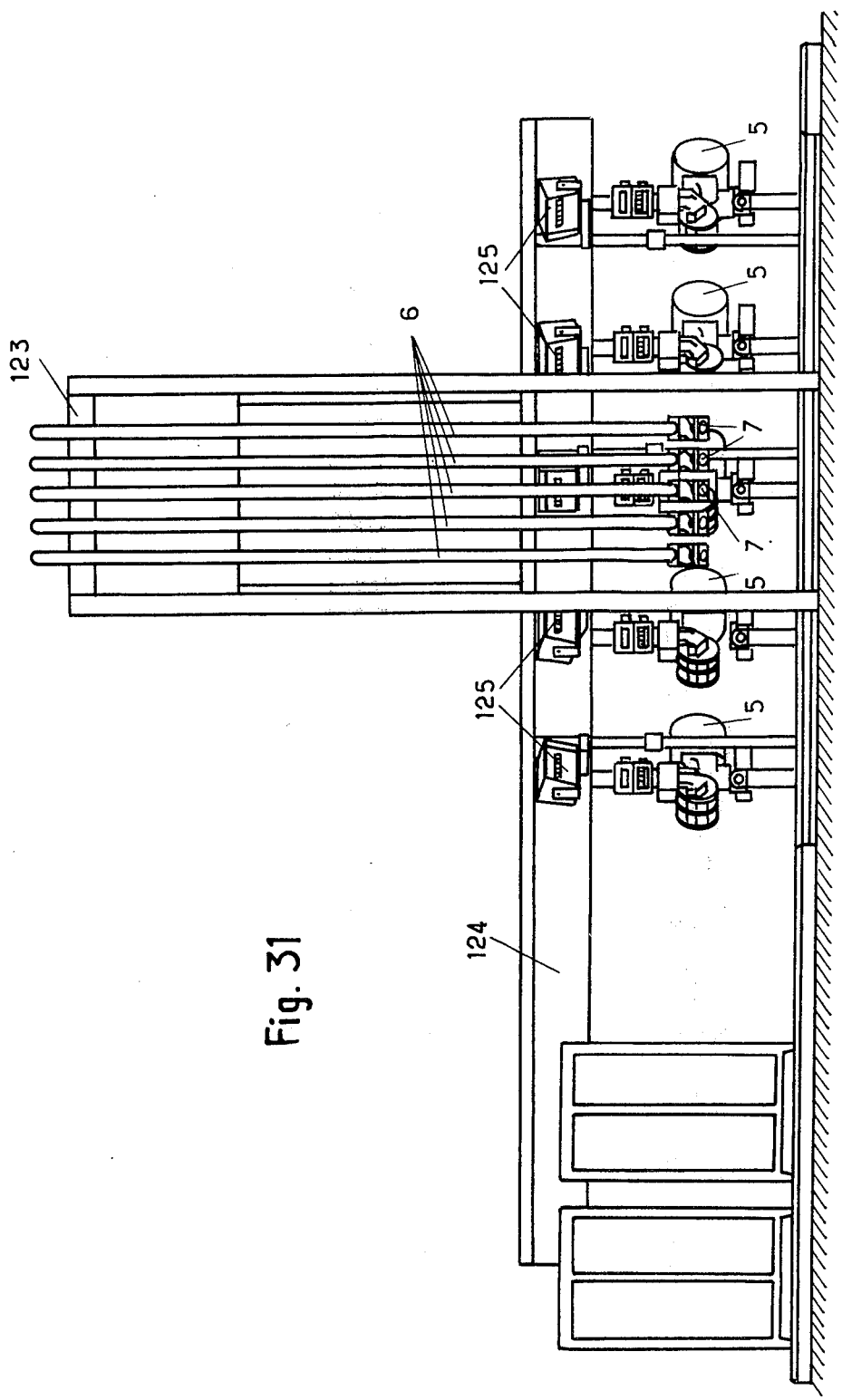
Figure 33:
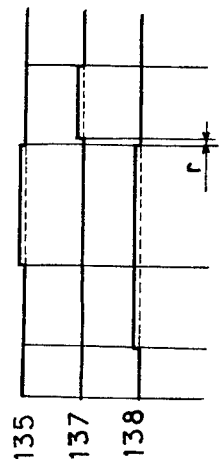
Figure 32:
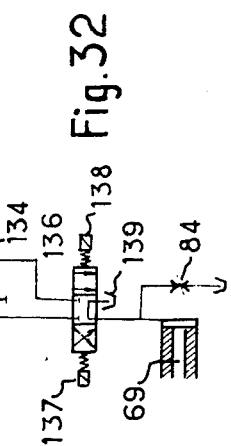
Figure 35:
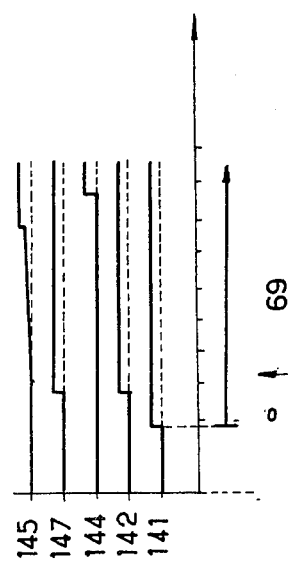
Figure 34:
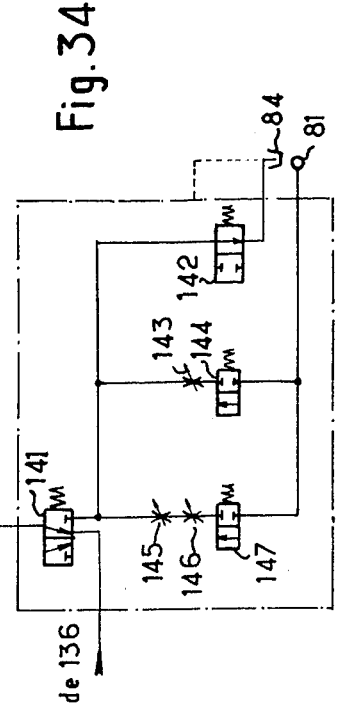

FIG. 6, similar to FIG. 5, shows the valve in a position in which it is still closed, but not locked;

FIG. 7 is a vertical section, of half length, on line VII—VII of FIG. 4, the tank being empty;

FIG. 8 shows a detail corresponding to part of FIG. 7, the tank being full;

FIG. 9 is a partial section on line IX—IX of FIG. 2, showing the safety pin retracted, the valve being in the closed and locked position;

FIG. 10, similar to part of FIG. 9, shows the safety pin in the operative position, the valve not being locked;

FIG. 11 is a partial section on line XI—XI of FIG. 2, showing the indicator of the quality of product to be loaded in the tanker;

FIGS. 12 and 13 are sections on lines XII—XII and XIII—XIII on FIG. 11;

FIG. 14 shows six positions of the indicator according to FIG. 11;

FIG. 15 is a front view of a connector according to said preferred embodiment of the invention;

FIG. 16 is a section on line XVI—XVI of FIG. 15, the connector being in the closed position;

FIG. 17 shows the hydraulic circuit of the connector according to FIG. 15;

FIG. 18 is a partial section on line XVIII of FIG. 15, showing the device for reading the quality of the product to be loaded;

FIGS. 19, 20 and 21 illustrate the device for controlling the emptiness of the tank to be loaded, FIG. 19 is a section on the broken line XIX—XIX of FIG. 20, FIG. 20 is a section on line XX—XX of FIG. 19 and FIG. 21 is a section on line XXI—XXI of FIG. 19;

FIG. 22 is a detail of FIG. 16, showing the calibrated flap valve of the connector;

FIG. 23 is a front view of the calibrated flap valve of FIG. 22;

FIG. 24 is a section on the broken line XXIV—XXIV of FIG. 23;

FIG. 25 is a partial section on line XXV of FIG. 16, showing the safety flap valve and its related members;

FIG. 26 is a partial section on line XXVI of FIG. 25;

FIG. 27 is a section on the broken line XXVII—XXVII of FIG. 16;

FIG. 28 is a partial section on line XXVIII of FIG. 27;

FIG. 29 is a partial section on line XXIX—XXIX of FIG. 27;

FIG. 30 is a lateral elevation of a loading station according to the invention;

FIG. 31 is a front elevational view of a loading island according to the invention;

FIG. 32 shows the hydraulic circuit of the automatic control according to the invention;

FIG. 33 shows the operating sequence of the automatic control according to FIG. 32;

FIG. 34 shows the hydraulic circuit of the manual control according to the invention;

FIG. 35 explains the operation of the manual control according to FIG. 34.

Figure 1:
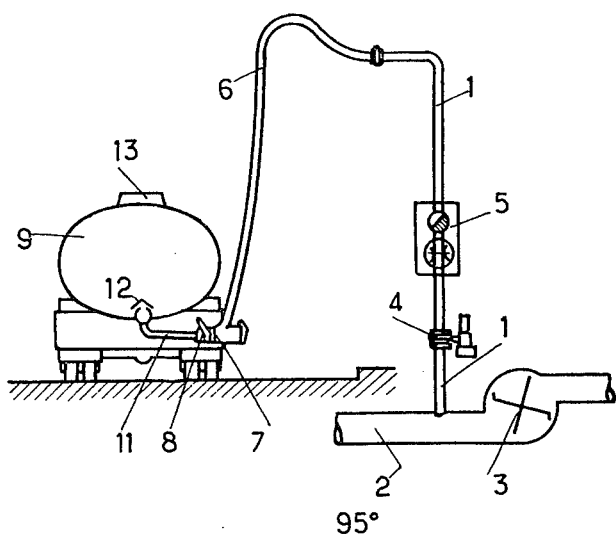
FIG. 1 is an elevational view showing diagrammatically the bottom filling of a tank wagon.

With reference to FIG. 1, which is an elevational view of the bottom filling of a tank wagon: the distribution station comprises an outgoing pipe 1 leading from an omnibus pipe 2 with its pump 3, provided with a safety valve 4, a volumetric counter with a flow limiter 5 and extended by a flexible metal pipe 6 terminated by a connector 7; for filling, this connector 7 is coupled to the valve 8 of the tank 9. From the valve 8, a pipe 11 leads to the base of the tank 9, where it opens out vertically under a deflector 12. At the top, the tank 9 is provided with a manhole with a safety valve 13.

With reference to FIGS. 2 and 3, which are external views thereof and to FIGS. 4 and 5, which are the main sections thereof : this tanker valve according to the invention comprises a hollow body in two parts 21 and 22, of light alloy. The rear part 21 is connected to said pipe 11, the front part 22 is provided with a large aperture 23, to which may be coupled and locked the connector (not shown) or a standardized flexible pipe which may be closed by a flap valve 24. This flap valve 24 (FIG. 6) is supported by a connecting rod 25 forming a knuckle joint with a profiled lever 26 pivoted on gusset 27 of an operating shaft 28 actuated by an operating lever 29 (FIG. 3). This operating lever is of the type closed by hand, which makes it possible to carry out the closure possibly remotely (by means of a pole for example) and it is provided with a locking lever 31 preventing any accidental opening. The operating lever 29 and its shaft 28 may occupy three positions: In the position valve closed and locked FV (FIGS. 3 and 5), the knuckle joint 25–26 is straight and the bottom of the lever 26 abuts against a boss 32 on the body 22. Thus, the flap valve is locked in the closed position by the abutment of its linkage and any accidental opening under the effects of vibrations or impact is prevented. In the position valve closed and not locked $\overline{FV}$ (FIG. 6), obtained by a rotation through approximately 10°, the knuckle joint 25–26 is bent and the bottom of the lever 26 has escaped the boss 32. Finally, in the open position 0 (broken line in FIG. 6), the arrangement has turned through approximately 95° and the flap valve 24 in the position 0 frees the passage for the liquid to be loaded. As shown in FIG. 6, an eccentric 33 makes it possible to regulate the position of the connecting-rod 25 and of the flap valve 24 and a pin spring 34 directs the cone supporting the flap valve 24 during the closing movement.

With reference to FIG. 7 (tank empty) and 8 (tank full): this tank valve according to the invention is provided, in the rear body 21 (FIG. 4), with a cylindrical float 41 having radial blades 42, mounted on a vertical shaft 43 which may slide and rotate in the body 21. Outside the body 21, the shaft 43 supports an indicator 44 under a transparent cover 45. If the tank is empty (FIG. 7), the float 41 and its shaft 43 rest on the body 21 and the indicator 44 is in the lower position in the transparent cover 45 and it is stationary. If the tank is not empty (FIG. 8), the float 41 floats and its shaft 43 bears under the transparent cover 45. The indicator 44 is in the upper position in the transparent cover 45. If, in addition, there is a flow of liquid, the current actuates the radial blades 42 of the float 41 and the indicator 44 rotates in the transparent cover 45 thus indicating both the direction and magnitude of the flow of liquid in the valve. Finally, should the transparent cover 45 be accidentally broken, the float 41 ascends slightly until its cone 45 is engaged in the upper passage of the shaft 43 in the body 21, which immobilises the indicator 44 and closes-off any leakage of liquid through the broken cover.

For coding the capacity of the tank, this tank valve according to the invention is provided, on the lower part of its nose (FIGS. 5 and 7) and above a centering hole 47, with a plurality (for example 8 as illustrated) of permanent magnets 48 placed vertically. Owing to the direction of their polarity, these permanent magnets announce, in coded binary decimals, the capacity of the tank, for example to the nearest half a cubic metre, to as many switches having flexible blades under glass ILS mounted in the connector (as described hereafter with reference to FIG. 15). Furthermore, it will be noted that this system ensures control of the coupling.

With reference to FIGS. 12, 13 and 14: this tank valve according to the invention is provided, on its front side, with a member for indicating the quality of the product to be loaded, constituted by a cylinder 51, which may be positioned by vertical sliding and rotation in the body 22 and comprising slots 52 whereof one may appear externally in a window 53 of the front side. Six configurations are thus obtained (FIG. 14), whereof five indicate by the position of the slot 52 as many qualities of the product to be loaded, the sixth (no slot) indicating a tank which should not be filled. This system of the valve co-operates with a corresponding system of the connector (as described hereafter with reference to FIG. 18) and coupling is possible solely if there is agreement between the indications relating to the product on the valve and connector.

Finally, this valve according to the invention is provided, on its front side (FIG. 2) with a safety pin 55, controlled positively by a rocker 56 and a cam 57 of the operating shaft 28 (FIG. 9). The safety pin 55 is withdrawn during locking of the flap valve (FIG. 10), otherwise it leaves under the action of its spring, then positively (FIG. 9) and, as described with reference to FIG. 15, it locks the coupling collar of the connector as soon as the valve is unlocked. It will be noted that this safety pin prevents the coupling of a connector to an open valve and, as will be seen with reference to FIG. 27, it is used in locking the hydraulic control.

With reference to FIG. 15, (front elevational view) and to FIG. 16 (median vertical section on line XVI—XVI of FIG. 15): this connector according to this preferred embodiment of the invention comprises a casing 61 of light alloy, forming a connection between the flexible pipe 6 and the tank valve and provided with a standardised connecting nose 63, with a rear casing 64, of light alloy, containing the mechanical and hydraulic safety mechanisms, and comprising, underneath, a sheath 65 supporting the device for reading the capacity and the button 66 for actuating the automatic control and a rear handle 67. The casing 61 houses a closure member 68, actuated by the chamber 69 of a hydraulic ram having a hollow rod 71 integral with the closure member 68 and returned by a cartridge comprising three springs 72. The control oil arrives through the inside 73 of the hollow rod 71 and passes, firstly, directly into the chamber 69 and, secondly, by means of a calibrated hydraulic escape member 84 (whereof the operation will be described hereafter), into a cavity 74 returning directly to the reservoir. Thus, the closure member 68 and hollow rod 71 move back together under the action of the pressure in the chamber 69 and the operating sequences at the time of opening of the closure member 68 are as follows:

no supply of control oil: closure member 68 is closed;

flow Q1 causing in the chamber 69 a force compressing the first spring 72 : the closure member 68 moves back by the distance 75 ;

flow Q2, greater than Q1, producing compression of the second spring 72 : the closure member 68 moves back by the additional distance 76, i.e. in all 75 plus 76;

flow Q3, greater than Q2, producing compression of the third spring 72 : the closure member 68 moves back by the additional distance 77, i.e. a total distance of 75 plus 76 plus 77.

By way of example, these three stable positions of the closure member 68 ensure a flow of approximately 30m³/hour at the beginning of loading (up to approximately 5% of the capacity of the tank), then of 120 to 150m³/hour and 15m³/hour at the end of loading (the last 100 liters). This is naturally under automatic control, manual control controlling the rates of flow freely.

With reference to FIG. 17, which is a hydraulic diagram of the connector : after passing into a valve 82 safeguarding the coupling by mechanical control, the source 81 for the hydraulic control supplies a hydraulic unlocking ram 83, the hydraulic opening ram 69 and in parallel, a calibrated hydraulic escape member 84, which creates on the piston a pressure difference varying with the rate of flow of the control oil. The hydraulic opening ram 69 is also controlled by means of restrictors, by various rates of flow of oil and these rates of flow assure the control oil, whatever the atmospheric conditions, a stable temperature, from which result constant response times of the equipment. This advantage of the system according to the invention will be noted with respect to known systems having various oil pressures in which, since the oil does not circulate, its viscosity varies with the ambient temperature and thus causes the response times of the equipment to vary.

With reference to FIG. 15, housed in front of the sheath 65 is the member for reading the capacity of the tank to be filled, for example comprising eight bulbs 85, each containing a switch having flexible plates sensitive to the magnetic field available on the market under the trade name ILS and able to co-operate with the indicator arrangement already described for the capacity of the tank to be filled, for example comprising eight permanent magnets 48 (FIGS. 5 and 7).

With reference to FIG. 1 and FIG. 18, which is a partial section on line XVIII of FIG. 15: on the front side of the nose 23 of the connector, the device for indicating the quality of the product to be loaded comprises a pin 86 which may be fixed and possibly sealed, in one of the five holes 87. The pin 86 clearly co-operates with the slot 52 described with reference to FIGS. 12 to 14.

With reference to FIGS. 19, 20 and 21: the device for controlling the emptiness of the tank to be loaded comprises a thermistance 89 mounted on a removable member 91 which may be plugged in a receptacle 92 comprising two leads 93 mounted at the bottom of a bore 88 in the nose 63, this bore normally being closed by a stopper 94 and connected by two conduits 95 to the groove of the nose 63. After opening the valve, the thermistance 89 responds to the possible presence of liquid in the valve and in this case it prevents loading of the tanker which is not completely empty.

With reference to FIG. 22, which is a detail of FIG. 16: between the flexible pipe 6 and the casing 61 of FIG. 16, the connector comprises a calibrated flap valve 96, the purpose of which is to prevent emptying of the flexible pipe 6 and thus the removal of a volume of the product, which would not cause the counter to operate. The calibrated flap valve 96 (FIGS. 22, 23, 24) is constituted by two semi-circles 97 pivoted on a transverse shaft 98 and urged into a closed position by a calibrated torsion spring 99.

Various safety mechanisms of the connector according to this preferred embodiment of the invention wll now be described.

The connector comprises (FIGS. 15 and 16) a rotating collar 101 actuated by an operating lever 102 and provided with helical ramps 103. It would not be possible to couple the connector to an open valve, since the safety pin 55 of the valve (already described with reference to FIG. 9) would abut against a solid part of the collar 101 comprising ramps 103. On the other hand, once the coupling was achieved, an elongated hole 104 (FIG. 15) is located opposite the safety pin 55, which leaves under the action of its spring when the valve is opened, which makes uncoupling impossible from the beginning of opening of the valve. Solely at the end of opening, the removal of the safety pin 55 is controlled positively, with a sufficient force to push the part 105 (FIG. 26), which actuates the rod 106, which opens the safety flap valve 82 (FIGS. 25 and 26). The operating button 66 of the automatic control is released by the member 111 (FIG. 27), since the latter may move upwards solely when the rod 106 is actuated. The safety flap valve, as already described with reference to FIG. 17, supplies the opening ram 69 (FIG. 28) and the unlocking ram 83. The unlocking ram 83 on the one hand breaks the knuckle joint 107–108, which was locking the closure member 68 in the closed position (FIG. 16 and FIG. 29) and on the other hand, pushes a rod 109 (FIG. 29), which locks the rotating collar 101, which prevents any uncoupling. When the valve is closed, the safety pin 55 remains withdrawn under the action of its spring and prevents uncoupling until the last 10° of travel of the operating lever. On the other hand, as soon as the valve begins to leave its open position, the safety pin 55 is pushed by the part 105 and the rod 106, the safety flap valve 82 re-closes and the opening ram 69 closes the closure member 68.

With reference to FIG. 30, which is a side view of a filling station according to the invention: the flexible pipe 6, terminated by the connector 7, is supported by a cranked beam 121 having a counter weight 122 at the top of a support 123. The arm of the beam 121 is horizontal when the connector 7 is free, thus providing a free return of the connector 7. In the coupling position (shown in dot dash line), the connector 7a is lowered, as well as the flexible pipe 6a, the beam 121a is raised and the counter weight 122a virtually balances the weight of the connector and of the pipe. This considerably facilitates the forwards movement of the coupling and coupling by the personnel.

With reference to FIG. 31, which is a front elevational view of a loading island according to the invention : this island is equipped with five stations making it possible to supply petrol, super fuel, gas oil and domestic fuel, the fifth arm being assigned to one of the four products which is in most demand depending on the time of year and/or locality. The island thus comprises five flexible pipes 6 and five connectors 7 on a common support 123 and under a common roof 124, five volumetric counters with flow limiters 5 and five control and indicator boxes 125, the automatic mechanisms being housed at a distance in a sheltered location.

With reference to FIG. 32, which shows the hydraulic circuit for the automatic control according to the invention: the latter includes the pump 81 (with its conventional accesories) and the ram 69 for opening the closure member of the connector with its calibrated escape member 84, already described with reference to FIG. 17 (the safety flap valve 82 and unlocking ram 83 not intervening in this case). The pump 81 supplies three adjustable restrictors in parallel, 131 for the low rate of flow (at the beginning of filling), 132 for the high rate of flow and 133 for the reduced rate (at the end of filling). The restrictors 131 and 132 lead to an electric valve 134, controlled by an electromagnet 135 having two positions, in the inoperative position, the restrictor 131 is connected to the outlet and the restrictor 132 is out of operation and in the operative position, their positions are reversed. The outlet of the electric valve 134 and restrictor 133 lead to an electric valve 136, controlled by two electromagnets 137 and 138 having three positions: in the inoperative position, the two inlets are blocked and the ram 69 is connected to the reservoir 139, thus it closes the closure member of the connector; in the operative position at 137, the outlet of 134 is connected to the reservoir 139 and the restrictor 133 (reduced rate of flow) supplies the ram 69 (i.e. at the end of filling). In the operative position at 138, the restrictor 133 is connected to the reservoir 139 and the outlet of 134 supplies the ram 69, this is thus the beginning of filling, if 135 is not supplied with current and filling at the full rate of flow, if 135 is supplied with current. This is illustrated in FIG. 33, which illustrates the operating sequence. It will be noted that to obtain a free passage to a reduced rate of flow at the end of filling, the passage to an operative position by 137 is delayed by a period r after abandoning the operative position by 138.

With reference to FIG. 34, which shows the hydraulic circuit for the manual control according to the invention : this arrangement is interposed between the outlet of the electric valve 136 and the inlet of the ram 69 of FIG. 33. This arrangement comprises a distributor 141 having two positions, connecting the ram 69 either to the electric valve 136 (automatic control) or, in the case of manual control, to a distributor 142 having two positions, leading in the operative position to the reservoir 84 and to an adjustable restrictor 143 having a high rate of flow connected to a distributor 144 having two positions leading to the pump 81 in the operative position and to a controlled restrictor 145 connected to an adjustable restrictor 146 having a low rate of flow connected to a distributor having two positions 147, leading in the operative position to the pump 81. This arrangement is controlled manually by a rotary control button, as explained in FIG. 35, where the rotation of this button is shown on the X-axis: downwards in one direction, the "automatic" position directly joins the electric valve 136 and the ram 69, then, from a "zero" position, the distributor 141 is actuated, the electric valve 136 is blocked and the automatic control is cut (it will thus be noted that the manual control always has priority over the automatic control.) Later, the distributors 142 and 147 are actuated and the ram 69 is supplied by the controlled restrictor 145 which is opened progressively, which firstly produces a sensitive control (for the end of filling) until the time of a low rate of flow (for the beginning of filling). Finally, the distributor 144 is actuated, producing the high rate of flow. For all positions to the right of zero, a spring constantly returns the control button towards this zero, thus providing a dead man's safeguard.

I claim:

1. Apparatus for supplying a liquid product to a pipe connected to the bottom of vessel from a flexible conduit connected to a distribution station, said apparatus comprising a tank valve including a hollow body constituted by two parts inclusive of a rear part adapted for connection to the pipe connected to the bottom of the vessel and a front part provided with a large aperture and having coupling means, a flap valve for closing said aperture, means for actuating said flap valve comprising a connecting rod supporting said flap valve, a profiled lever forming a knuckle joint with said connecting rod, an operating shaft rotatably supported by said hollow body, a gusset connected to said operating shaft, said profiled lever being pivotably connected to said gusset, an operating lever extended externally of said body and connected to said shaft to rotate the same, a coupling for connection with the coupling means of the tank valve and the flexible conduit connected to the distribution station, said coupling comprising a main casing connected to the flexible conduit, a connecting nose on said casing for lockable connection with the coupling means of the body of the tank valve, a rear casing including mechanical and hydraulic safety means, a closure member in said main casing for controlling flow of liquid product from the flexible conduit to the tank valve and means for actuating said closure member by remote control, said flap valve being applied against said closure member in coupled and closed position of the tank valve such that upon separation of the tank valve from the coupling at the end of supply of liquid to the vessel only a negligible guantity of liquid product is released.

2. Apparatus as claimed in claim 1 wherein said operating lever includes a locking lever.

3. Apparatus as claimed in claim 1 comprising an adjustable eccentric on said connecting rod bearing against said profiled lever, and a pin spring acting on said flap valve for orienting the valve during closing movement thereof.

4. Apparatus as claimed in claim 1 wherein said tank valve further comprises internally a cylindrical float having radial blades, a vertical shaft carrying said float and slidably and rotatably mounted in the valve body, said vertical shaft extending outside said valve body, an indicator on said shaft, a transparent cover on said indicator and a cone on the float engaging the valve body in the case of breakage of the transparent cover.

5. Apparatus as claimed in claim 1 wherein said tank valve includes, at the front thereof, a plurality of permanent magnets indicating, in coded binary members, the capacity of the tank.

6. Apparatus as claimed in claim 1 wherein said tank valve includes, at the front thereof, a cylinder positionable by vertical sliding and rotation in the valve body and provided with supporting slots only of which can appear in a window of the front side of the tank valve for indicating the product to be loaded in the vessel.

7. Apparatus as claimed n claim 1 wherein said tank valve includes, at the front thereof, a safety pin, a spring acting on said pin, a rocker member acting on said pin and a cam connected to said operating shaft and acting on said rocker member to displace the pin when the tank valve is unlocked.

8. Apparatus for supplying a liquid product to a pipe connected to the bottom of vessel from a flexible conduit connected to a distribution station, said apparatus comprising a tank valve including a hollow body constituted by two parts inclusive of a rear part adapted for connection to the pipe connected to the bottom of the vessel and a front part provided with a large aperture and having coupling means, a flap valve for closing said aperture, means for actuating said flap valve including an operating lever, a coupling for connection with the coupling means of the tank valve and the flexible conduit connected to the distribution station, said coupling comprising a main casing connected to the flexible conduit a connecting nose on said casing for lockable connection with the coupling means of the body of the tank valve, a rear casing including mechanical and hydraulic safety means, a closure member in said main casing for controlling flow of liquid product from the flexible conduit to the tank valve, a hydraulic ram for actuating said closure member, a cartridge in said casing for returning said closure member to initial position including three springs of staggered force having limited travel such that increase of pressure in the ram gives the closure member three stable positions of increasing opening, said flap valve being applied against said closure member in coupled and closed position of the tank valve such that upon separation of the tank valve from the coupling at the end of supply of liquid to the vesel only a negligible quantity of liquid product is released.

9. Apparatus as claimed in claim 8 wherein said hydraulic ram comprises, in parallel, a calibrated hydraulic leakage member, said ram and said leakage member being supplied at various rates of flow of control oil, by means of various restrictors, from a hydraulic control source.

10. Apparatus as claimed in claim 8 wherein said tank valve includes at the front thereof, a plurality of permanent magnets indicating, in coded binary numbers, the capacity of the tank, said connector including, at the front thereof, a plurality of switches having flexible plates under a glass bulb, which are able to read the magnetic signals produced by said magnets.

11. Apparatus as claimed in claim 8 wherein said tank valve includes, at the front thereof, a cylinder positionable by vertical sliding and rotation in the valve body and provided with supporting slots only one of which can appear in a window at the front side of the tank valve for indicating the product to be loaded in the vessel, said connector including, at the front thereof, a device for indicating the quality of the product to be loaded comprising a pin which may be selectively fixed in one of five holes and which may be housed in the exposed indicator slot in the tank valve.

12. Apparatus as claimed in claim 8 wherein said connector includes at the front thereof, a thermistance, housed in a hollow provided in the connector nose, connected to a groove provided in the nose, such that after opening of the valve, responding to the possible presence of liquid to prevent filling of the vesel which is not completely empty.

13. Apparatus as claimed in claim 8 wherein said connector further comprises, between said flexible conduit and said casing, a calibrated flap valve which prevents emptying of the flexible conduit and which is constituted by two semi-circular members pivoted on a transverse shaft and a calibrated torsion spring urging said semi-circular members closed.

14. Apparatus as claimed in claim 8 wherein said tank valve includes, at the front thereof, a safety pin, a spring acting on said pin, a rocker member acting on said pin and a cam connected to said operating shaft and acting on said rocker member to displace the pin when the tank valve is unlocked, said connector comprising a rotary collar actuated by an operating lever, comprising helical ramps, which can co-operate with said safety pin, on the one hand, by a solid part by preventing coupling to an open valve, on the other hand, by an elongated hole thus preventing uncoupling from a non-closed valve and finally by a rod pushed by the pin and opening a safety valve supplying the ram for opening the closure member.

15. Apparatus as claimed in claim 14 comprising an unlocking ram, supplied by said safety flap valve, to break the knuckle joint which kept the closure member locked in the closed position, to push a rod which locks said rotary collar and release a button for operating the automatic control.

16. Apparatus as claimed in claim 8 comprising an automatic control including an adjustable restrictor having a low rate of flow, and adjustable restrictor having a high rate of flow, an adjustable restrictor having a reduced rate of flow, an electric valve having two positions, connected to the restrictors for low and high rates of flow, said positions of the valve being an inoperative position connecting the restrictor having the low rate of flow to its outlet, and an operative position connecting the restrictor having the high rate of flow to its outlet and to a further electric valve having three positions, including an inoperative position connecting the ram of the closure member for the connector to a reservoir, a first operative position connecting the outlet of the first electric valve to said ram, and a second operative position connecting the restrictor for the reduced rate of flow to said ram, and a delay mechanism for delaying passage from the first operative position to the second operative position.

17. Apparatus as claimed in claim 16 comprising a manual control comprising a first distributor having two positions including an inoperative position connecting the outlet of said electric valve with the three positions to the ram of the closure member of the connector and an operative position isolating said outlet and connecting said ram to a common pipe, a second distributor having two positions including an inoerpative position connecting said cmmon pipe and the reservoir, and adjustable restrictor having a high rate of flow connected to said common pipe and a third distributor connected to said adjustable restrictor and having two positions including an operative position connecting the restrictor to the pump, a common restrictor connected to said common pipe and a restrictor having a low rate of flow connected to a fourth distributor having two positions including a operative position connecting the restrictor to the pump and a manual control button, successively occupying an automatic position, and a zero position in which it puts th first distributor, then the second and the fourth distributors in the operative position and progressively opens said controlled restrictor and finally puts the third distributor in the operative position and a spring constanty urging said control button for each working position towards said zero position.

* * * * *